I. W. McGAFFEY.
Potato-Digger.
No. 11,899
Patented Nov. 7, 1854.
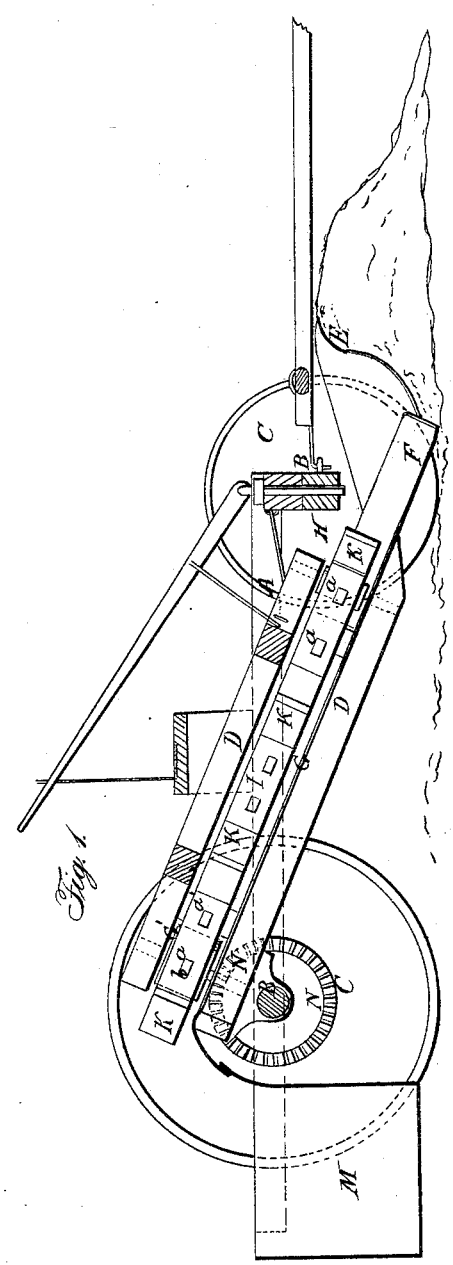
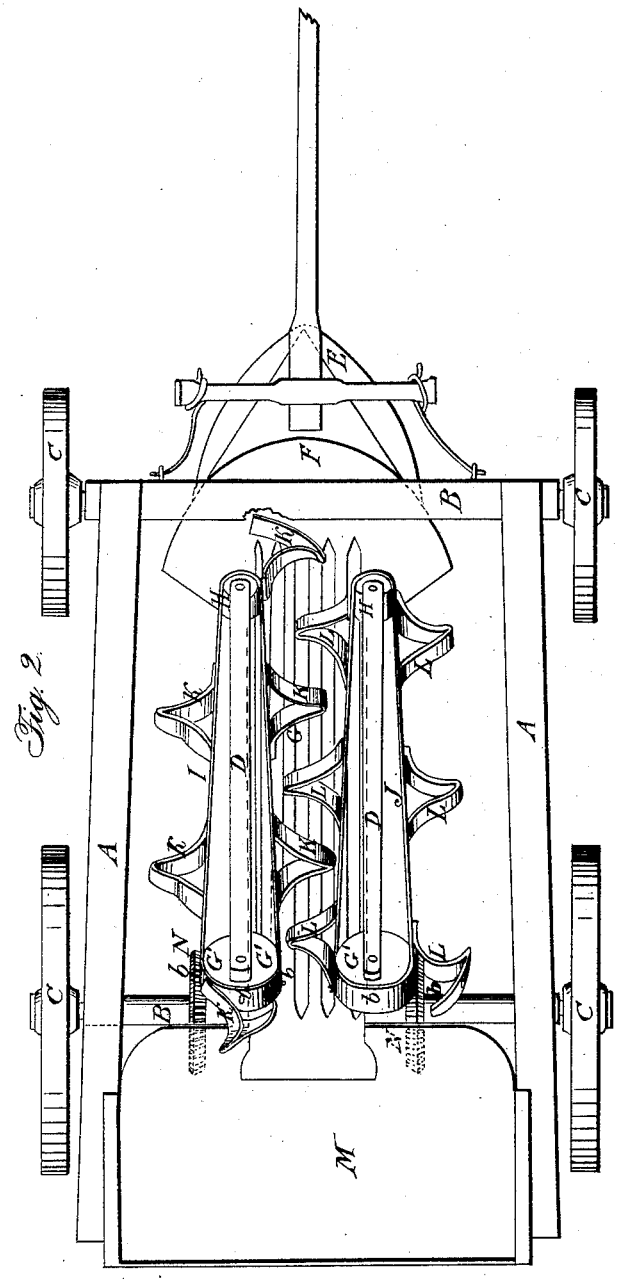

UNITED STATES PATENT OFFICE.

IVES W. McGAFFEY, OF PHILADELPHIA, PENNSYLVANIA.

IMPROVEMENT IN POTATO-DIGGERS.

Specification forming part of Letters Patent No. 11,899, dated November 7, 1854.

*To all whom it may concern:*

Be it known that I, IVES W. McGAFFEY, of Philadelphia, in the county of Philadelphia and State of Pennsylvania, have invented a new and useful Improvement in Elevators or Gatherers of Potato Diggers; and I do hereby declare that the following is a full, clear, and exact description of the same, reference being had to the accompanying drawings, forming part of this specification, in which—

Figure 1 is a vertical longitudinal central section of a potato-digger with my improvement. Fig. 2 is a plan or top view of the same, the driver's seat and the elevating and lowering lever being removed.

Similar letters of reference in each of the two figures indicate corresponding parts.

This improvement is designed to obviate a serious difficulty experienced in the use of the machines for digging potatoes which employ endless belts provided with wings for gathering and elevating the potatoes to the point from whence they fall or are discharged into the cart or receiver, the difficulty adverted to being the meeting and clashing together of the wings and other parts of the machine as the aprons revolve, and the consequent bruising of the potatoes.

The nature of said improvement consists in arranging two endless belts round revolving drums, which stand at right angles, or nearly so, to the digger and screen, and so arranging the wings which serve as gatherers and elevators on said belts that those of one belt will, when the belts both revolve together, always come opposite the spaces between the wings of the other belt, and vice versa, and thus avoid all possibility of the wings or any two parts of the machine clashing together and bruising the potatoes.

To enable others skilled in the art to make and use my invention, I will proceed to describe its construction and operation.

A represents the frame of the machine, made of oblong form, of any suitable material, and supported by the axles B B of the propelling-wheels C C C C.

D D represent another smaller frame set inclined, with its front end attached to the frame A and its hind end resting on the hind axle, B. This frame sustains the devices which constitute my improvement, and also the uncoverer E, digger F, and screen or separator G, which are constructed and arranged and secured to the bottom of the frame D in the manner essentially as shown in the drawings.

G' G' H H are the revolving drums upon which the endless belts I J are arranged, as represented. The axes of these drums stand at right angles, or nearly so, to the digger F and screen or separator G, and revolve in boxes formed in the frame D. The endless belts I J are arranged sufficiently far apart to avoid all liability of the elevators coming in contact with them, and have slits cut in them, and the drums G' G' have spurs or sprockets $b$ in their peripheries which take into said slits $a$ and cause the belts to revolve.

K L represent the wings for gathering and elevating the potatoes. These wings are arranged and attached fast to the belts I J and revolve with them, those on the belt I standing opposite the spaces between the wings on the belt J, and those on the belt J opposite the spaces between the wings on the belt I. By thus arranging the wings it must be evident all liability of them clashing together or bruising the potatoes is completely overcome.

M is the receiver, arranged behind the screen or separator, as shown.

N N represent bevel-gearing for driving the endless chains of elevators.

The operation is as follows: The machine being moved forward by a horse or other animal, the uncoverer E throws the vines and soil which lie upon the top of the potatoes from the center of the hill. The digger then passes under the potatoes and scoops them up, the forward motion of the machine causing the dirt and potatoes to rise upon the screen or separator, where they are caught by the elevators of the endless belts and carried over the screen or separator, which, in connection with the action of the gatherers and elevators, separates the dirt and allows it to escape, while the potatoes are carried along and deposited into the receiver.

What I claim as my invention, and desire to secure by Letters Patent, is—

Arranging two endless chains of elevators, I J, on drums which have their axes standing at right angles, or nearly so, to the screen and digger, and having the elevators of one of said chains come opposite the spaces between the elevators of the other chain, substantially as and for the purposes herein described.

IVES W. McGAFFEY.

Witnesses:
 O. D. MUNN,
 J. W. HAMILTON.